(12) United States Patent
Teranishi et al.

(10) Patent No.: US 9,427,687 B2
(45) Date of Patent: Aug. 30, 2016

(54) CERAMIC FILTER

(71) Applicant: NGK Insulators, Ltd., Nagoya (JP)

(72) Inventors: Makoto Teranishi, Nagoya (JP); Hideyuki Suzuki, Nagoya (JP); Manabu Isomura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/243,309

(22) Filed: Apr. 2, 2014

(65) Prior Publication Data

US 2014/0208707 A1 Jul. 31, 2014

Related U.S. Application Data

(63) Continuation of application No. PCT/JP2012/076147, filed on Oct. 9, 2012.

(30) Foreign Application Priority Data

Oct. 11, 2011 (JP) .................. 2011-223893

(51) Int. Cl.
  *B01D 39/06* (2006.01)
  *B01D 39/14* (2006.01)
  *B01D 39/20* (2006.01)
  (Continued)

(52) U.S. Cl.
  CPC ........ *B01D 39/2068* (2013.01); *B01D 46/2429* (2013.01); *B01D 46/2444* (2013.01); *B01D 63/066* (2013.01); *B01D 65/003* (2013.01); *B01D 71/024* (2013.01); *C03C 8/24* (2013.01);
  (Continued)

(58) Field of Classification Search
  CPC ........ C04B 35/00; B01D 63/06; B01F 29/52
  See application file for complete search history.

(56) References Cited

U.S. PATENT DOCUMENTS 5,194,154 A 3/1993 Moyer et al.
5,198,007 A 3/1993 Moyer et al.
(Continued)

FOREIGN PATENT DOCUMENTS

JP 59-013648 A1 1/1984
JP 62-129104 A1 6/1987
(Continued)

OTHER PUBLICATIONS

M. J. den Exter, et al., "Separation of Permanent Gases on the All-Silica 8-Ring Clathrasil DD3R," Zeolites and Related Microporous Materials: State of the Art, Studies in Surface Science and Catalysis, vol. 84, Ed. by J. Weitkamp et al., Elsevier (1994) 1159-1166.

(Continued)

*Primary Examiner* — Amber R Orlando
(74) *Attorney, Agent, or Firm* — Burr & Brown, PLLC

(57) ABSTRACT

Provided is a ceramic filter that can be used for a long time at a high temperature, including a porous substrate having a partition wall that defines and forms a cell extending from one end face to the other end face, the porous substrate being made of ceramic a separation membrane disposed on a wall face in the cell; and glass seal disposed at the one end face and the other end face so as not to block open frontal areas of the cell. The glass seal includes glass and inorganic particles dispersed in the glass, the inorganic particles being made of clay, and a ratio of a coefficient of thermal expansion of the glass seal to a coefficient of thermal expansion of the porous substrate is 90% or less.

1 Claim, 4 Drawing Sheets

(51) Int. Cl.
  *B01D 50/00* (2006.01)
  *B01D 24/00* (2006.01)
  *B01D 63/06* (2006.01)
  *B01D 65/00* (2006.01)
  *B01D 71/02* (2006.01)
  *C03C 8/24* (2006.01)
  *C04B 38/00* (2006.01)
  *B01D 46/24* (2006.01)
  *C04B 111/00* (2006.01)

(52) U.S. Cl.
  CPC ....... *C04B 38/0012* (2013.01); *B01D 2313/04* (2013.01); *C04B 2111/00793* (2013.01)

(56) References Cited

U.S. PATENT DOCUMENTS

| | | |
|---|---|---|
| 2004/0173094 A1 | 9/2004 | Nakayama et al. |
| 2004/0187690 A1 | 9/2004 | Suzuki |
| 2005/0229779 A1 | 10/2005 | Nakayama et al. |
| 2006/0213165 A1 | 9/2006 | Isomura et al. |
| 2008/0093290 A1 | 4/2008 | Isomura et al. |
| 2010/0298115 A1 | 11/2010 | Yajima et al. |
| 2013/0126420 A1 | 5/2013 | Teranishi et al. |

FOREIGN PATENT DOCUMENTS

| | | |
|---|---|---|
| JP | 03-177332 A1 | 8/1991 |
| JP | 07-501783 A1 | 2/1995 |
| JP | 2001-300273 A1 | 10/2001 |
| JP | 2002-273129 A1 | 9/2002 |
| JP | 2003-286018 A1 | 10/2003 |
| JP | 2004-066188 A1 | 3/2004 |
| JP | 2004-305993 A1 | 11/2004 |
| JP | 2005-313156 A1 | 11/2005 |
| JP | 2006-263498 A1 | 10/2006 |
| JP | 3933907 B2 | 6/2007 |
| JP | 3953833 B2 | 8/2007 |
| JP | 4006107 B2 | 11/2007 |
| WO | 93/11087 A1 | 6/1993 |
| WO | 2008/050812 A1 | 5/2008 |
| WO | 2010/070991 A1 | 6/2010 |

OTHER PUBLICATIONS

International Search Report and Written Opinion dated Dec. 11, 2012.
Canadian Office Action (Application No. 2,851,219) dated Mar. 11, 2015.
English translation of International Written Opinion (PCT/ISA/237) (Application No. PCT/JP2012/0761/17) dated Dec. 11, 2012.
Chinese Office Action (With English Translation), Chinese Application No. 201280049751.1, dated Apr. 14, 2015 (11 pages).
Canadian Office Action, Canadian Application No. 2,851,219, dated Dec. 8, 2015 (4 pages).
Extended European Search Report, European Application No. 12839603.3, dated May 28, 2015 (8 pages).
Japanese Office Action (Application No. 2013-538546) dated Jun. 7, 2016 (with English translation).

CERAMIC FILTER

BACKGROUND OF THE INVENTION

1. Field of the Invention

The present invention relates to a ceramic filter and more particularly relates to a ceramic filter that can be used for a long time at a high temperature.

2. Description of Related Art

A ceramic filter including a ceramic porous body is reliable because it has excellent mechanical strength and durability in comparison with those of a polymer film. A ceramic filter has a high corrosion resistance as well, and so it is not degraded during chemical washing with acid, alkali or the like. A ceramic filter further can be controlled precisely in its average pore size that is a factor to determine the filtration ability. Since a ceramic filter has such various advantages, such a filter has been used in the wide range of field including not only the field of water treatment and exhaust gas treatment but also the field of pharmaceutical and food so as to filter out suspended matter, bacteria, dust and the like existing in a fluid such as liquid and gas for removal. A ceramic filter has been used for other purposes also for pervaporation to separate and purify the mixture of liquid containing two or more ingredients and for gas separation to separate and purify the mixture of gas containing two or more ingredients.

Ceramic filters used, for example, include a columnar porous substrate, a separation membrane disposed on a wall face in a cell, and glass seal (an end-part glass sealing portion) disposed so as to cover an end face of the porous substrate. Herein the columnar porous substrate includes a plurality of "cells extending from its one end face to the other end face." In addition, the columnar porous substrate is made of ceramic. Thereby, such a columnar porous substrate allows fluid permeability inside the element to be enhanced while keeping the filtration performance (see Patent Document 1, for example).

CITATION LIST

Patent Document

[Patent Document 1] JP-A-2006-263498

SUMMARY OF THE INVENTION

Problems to be Solved by the Invention

The ceramic filter described in Patent Document 1 has high corrosion resistance and is capable of effectively removing suspended matter, bacteria, dust and the like mixed in fluid such as liquid and gas. When this filter, however, is used for a long time at high temperatures in the presence of water, there has been a problem that cracks unfortunately occur at the end-part glass sealing portion. When the ceramic filter is exposed to alkaline aqueous solution at a high temperature during its manufacturing as well, e.g., when a zeolite separation membrane is disposed at the substrate, cracks occur at the end-part glass sealing portion in some cases.

In view of the problems of the conventional technique, it is an object of the present invention to provide a ceramic filter including an end-part seal (glass seal) that can be used for a long time at a high temperature in the presence of water.

Means for Solving the Problems

The present invention provides the following ceramic filter.

According to a first aspect of the present invention, a ceramic filter includes: a porous substrate having a partition wall that separates and defines a cell extending from one end face to the other end face is provided, the porous substrate being made of ceramic; a separation membrane placed on a wall face in the cell; and glass seal placed at the one end face and the other end face so as not to block open frontal areas of the cell. The glass seal includes glass and inorganic particles dispersed in the glass, the inorganic particles being made of clay, and a ratio of a coefficient of thermal expansion of the glass seal to a coefficient of thermal expansion of the porous substrate is 90% or less.

According to a second aspect of the present invention, in the ceramic filter according to the first aspect of the present invention, area occupancy of the inorganic particles with respect to the glass seal is 5 to 50%.

Advantageous Effects of Invention

A ceramic filter of the present invention includes glass seal disposed at end faces of a porous substrate. In the glass seal, inorganic particles made of clay are dispersed, and a ratio of a coefficient of thermal expansion of the glass seal to a coefficient of thermal expansion of the porous substrate is 90% or less. This allows the ceramic filter of the present invention to be used for a long time at a high temperature.

DETAILED DESCRIPTION OF THE INVENTION

The following describes embodiments of the present invention, with reference to the drawings. The present invention is not limited to the following embodiments. The present invention is to be understood to include the following embodiments, to which modifications and improvements are added as needed based on the ordinary knowledge of a person skilled in the art without departing from the scope of the present invention.

(1) Ceramic Filter

Figure 1:
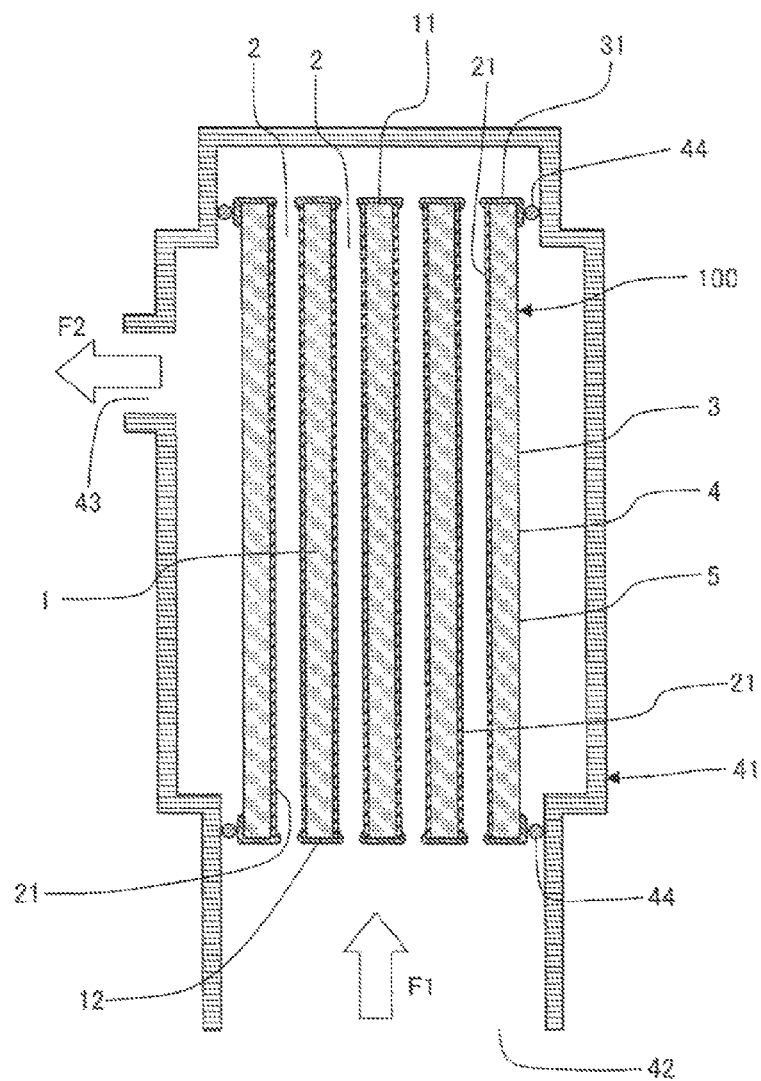
FIG. 1 is a schematic view showing a ceramic filter that is one embodiment of the present invention attached to a housing, showing a cross section that is in parallel with the cell extending direction of the ceramic filter.

As shown in FIG. 1, one embodiment of a ceramic filter of the present invention includes a porous substrate 3, a separation membrane 21 and glass seal 31. Then the porous substrate 3 includes a partition wall 1 "to defines and forms a plurality of cells 2 extending from one end face 11 to the other end face 12" and an outer peripheral wall 4 "located at the most outer periphery," and is made of ceramic. Then, the separation membrane 21 is disposed on a wall face in each cell 2. The glass seal 31 is disposed at the one end face 11 and the other end face 12 so as "not to block open frontal areas of each cell 2." The glass seal 31 of the ceramic filter 100 of the present embodiment includes glass and inorganic particles dispersed in the glass. In the ceramic filter 100 of the present embodiment, the inorganic particles are made of clay. The ceramic filter 100 of the present embodiment has "a ratio of a coefficient of thermal expansion of the glass seal 31 to a coefficient of thermal expansion of the porous substrate 3" (a thermal expansion coefficient ratio of the glass seal) that is 900 or less. Herein "the wall face in the cell 2" means "a surface of the partition wall 1" exposed to the cell 2. The porous substrate 3 preferably includes a plurality of cells 2, or may include one cell 2. The ceramic filter 100 of the present embodiment has the outer peripheral wall 4, or may not have the outer peripheral wall 4. FIG. 1 is a schematic view showing a ceramic filter that is one embodiment of the present invention attached to a housing 41, showing a cross section that is in parallel with the extending direction of the cells 2 of the ceramic filter 100.

In this way, the ceramic filter 100 of the present embodiment includes the glass seal 31 disposed at an end face of the porous substrate 3, the glass seal including glass and "inorganic particles dispersed in the glass and made of clay" (the inorganic particles are dispersed in the glass seal 31). Thus even when thermal stress is applied to the ceramic filter 100 during the operation at a high temperature, such stress can be alleviated by the existence of the inorganic particles made of clay, and so the ceramic filter can be used for a long time at a high temperature. Further since "the thermal expansion coefficient ratio of the glass seal" is 90% or less, "cracks, which may occur at the glass seal 31 due to a difference in thermal expansion between the glass seal 31 and the porous substrate 3" when the ceramic filter 100 is used at a high temperature, can be prevented. For a ceramic filter like the ceramic filter 100 of the present embodiment having a complex shape like honeycomb, residual stress often occurs during its manufacturing process. Especially in the case of a honeycomb-shaped ceramic filter of 5,000 cm$^3$ or more, the residual stress easily may occur. As a result, such a large honeycomb-shaped ceramic filter often generates cracks at its glass seal. The present invention can exert especially remarkably the advantageous effect to prevent cracks at the glass seal when a ceramic filter has a large honeycomb shape.

The following describes the ceramic filter 100 of the present embodiment for each element.

(1-1) Porous Substrate

Figure 2:
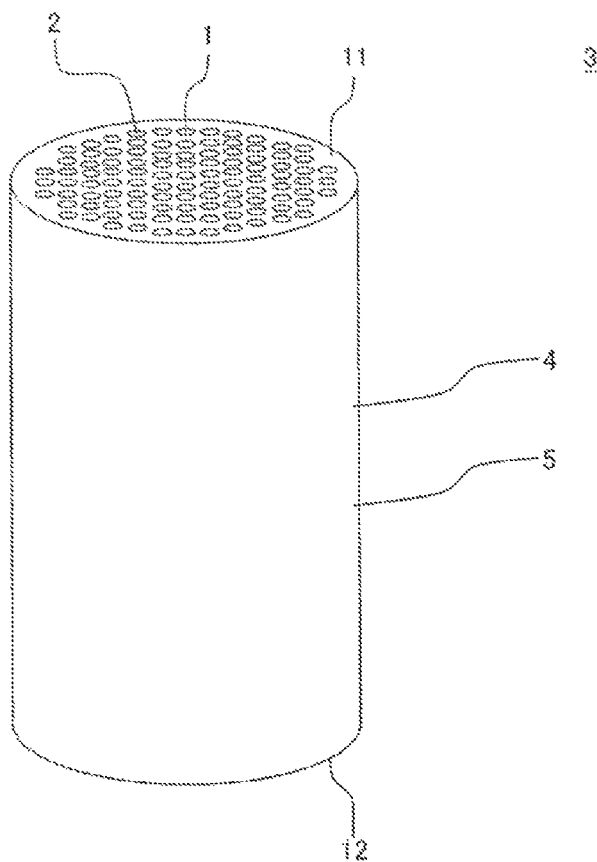
FIG. 2 is a perspective view schematically showing a porous substrate constituting one embodiment of the ceramic filter of the present invention.

In the ceramic filter 100 of the present embodiment (see FIG. 1), as shown in FIG. 2, the porous substrate 3 includes the partition wall 1 to defines and forms a plurality of cells 2 extending from one end face 11 to the other end face 12, and the outer peripheral wall 4 located at the most outer periphery. The porous substrate 3 is made of ceramic. "The outer peripheral wall 4 located at the most outer periphery of the porous substrate 3" means that the outer peripheral wall 4 is located at the most outer periphery "in a cross section that is perpendicular to the direction where the cells of the porous substrate 3 extend." FIG. 2 is a perspective view schematically showing the porous substrate 3 constituting one embodiment of the ceramic filter of the present invention.

The partition wall and the outer peripheral wall constituting the porous substrate have an average pore diameter that is decided with consideration given to balance between the mechanical strength and filtration resistance. Typically the average pore diameter is preferably 1 to 100 μm. The porosity is preferably 25 to 50%. The average pore diameter and the porosity are values measured by a mercury porosimeter.

The partition wall making up the porous substrate preferably has a stacking structure including a partition wall main body and a separation membrane supporting layer that covers the surface of the partition wall main body. A part of the entire partition wall other than the separation membrane supporting layer is the partition wall main body. In this case, "the wall face (surface of the partition wall) in the cell" of the porous substrate is the surface of the separation membrane supporting layer. Then, a separation membrane is preferably placed at the surface of the separation membrane supporting layer. The separation membrane supporting layer is preferably made of ceramic.

The porous substrate (partition wall, outer peripheral wall) is made of ceramic, and is preferably made of alumina ($Al_2O_3$), titania ($TiO_2$), mullite ($Al_2O_3SiO_2$), zirconia ($ZrO_2$) or the like. Among them, alumina is more preferable because a raw material (aggregate particles) thereof having a controlled particle size can be easily available, from which a stable kneaded material can be formed, and has high corrosion resistance. The partition wall main body of the porous substrate and the separation membrane supporting layer of the porous substrate may be configured, as one option, so that "aggregate particles are mutually coupled by a glass component (sintering aid) at at least a part thereof." The thus configured ceramic filter can be manufactured by firing at a lower temperature and can be produced at lower cost.

The porous substrate preferably has a columnar shape (this may be a "tubular shape" when it is considered to have a hollow inside due to the cells) having one end face 11, the other end face 12 and an outer peripheral face 5. The porous substrate preferably has a "honeycomb shape" or a "monolith shape" because such a shape can increase the filtration area per unit volume and can enhance the processing ability.

The overall shape or the size of the porous substrate is not limited especially unless they do not interfere with its filtration function. Exemplary overall shapes include a columnar (or cylindrical) shape, a quadrangular prism shape (or a tubular shape having a cross section perpendicular to the central axis that is a rectangle) or a triangle prism shape (or a tubular shape having a cross section perpendicular to the central axis that is a triangle). Among them, a columnar (or cylindrical) shape is preferable. For the purposes of precise filtration and ultrafiltration, the porous substrate preferably has a columnar shape of 30 to 180 mm in diameter of cross section that is perpendicular to the central axis and 150 to 2,000 mm in length in the central axis direction.

The cells of the porous substrate may have a circular or polygonal cross sectional shape (shape in a cross section perpendicular to the direction where the cells extend), for example. Exemplary polygons include a quadrangle, a pentagon, a hexagon and a triangle. The direction where the cells extend is the same direction as the central axis direction when the porous substrate has a columnar (or cylindrical) shape.

When the cells of the porous substrate have a circular shape in its cross section, the cells preferably have a diameter of 1 to 5 mm. When the diameter is less than 1 mm, the filtration area may be small when cell density is fixed. When the diameter is larger than 5 mm, the strength of the ceramic filter may deteriorate.

When the cells of the porous substrate have a polygonal shape in its cross section, the partition wall preferably has a thickness of 0.3 to 2 mm. When the thickness is smaller than 0.3 mm, the strength of the ceramic filter may deteriorate. When the thickness is larger than 2 mm, the pressure loss during the passage of fluid may increase.

(1-2) Separation Membrane

In the ceramic filter of the present embodiment, its separation membrane is made up of a porous body having a plurality of pores formed therein, and is disposed on a wall face (surface of the partition wall) in each cell.

The separation membrane has an average pore diameter that can be decided appropriately depending on the required filtration performance (a particle diameter of a substance to be removed). For instance, in the case of a ceramic filter for precise filtration or ultrafiltration, the average pore diameter is preferably 0.01 to 1.0 µm. The average pore diameter of the separation membrane is a value measured by the air-flow method specified by ASTM F316. In the case of a ceramic filter for the purposes of gas separation and pervaporation, the types of the "separation membrane" of the gas separation and pervaporation filters is not limited especially. For instance, they may be selected appropriately from well-known carbon monoxide separation membrane, helium separation membrane, hydrogen separation membrane, carbon membrane, MFI-type zeolite membrane, DDR-type zeolite membrane, silica membrane and the like depending on the types of gas to be separated. The separation membrane used may include, for example, a carbon monoxide separation membrane described in JP-4006107, a helium separation membrane described in JP-3953833, a hydrogen separation membrane described in JP-3933907, a carbon membrane described in JP-A-2003-286018, a DDR-type zeolite membrane composite body described in JP-A-2004-66188, or a silica membrane described in WO 2008/050812.

(1-3) Glass Seal

In the ceramic filter of the present embodiment, the glass seal is disposed at one end face and the other end face (both end faces) of the porous substrate so as not to block open frontal areas of each cell. The glass seal is preferably disposed, at the both end faces of the porous substrate, so as to cover the entire wall face part (a part where the wall exists and there is no opening (cell) (not open)). The glass seal is preferably in contact with the separation membrane disposed on the wall face in each cell without gap therebetween (no gap between the glass seal and the separation membrane). "No gap between the glass seal and the separation membrane" means that an end of a tubular separation membrane disposed on the wall face in each cell is in contact with the glass seal so as to be connected to the glass seal, and there is no "exposed part of the wall face of the porous substrate" between the glass seal and the separation membrane. In this case, a part of the glass seal may enter the cell along the wall face in the cell. Even when a part of the glass seal enters a cell, unless such a part completely blocks the open frontal areas of the cell, then "the glass seal is disposed at the one end face and the other end face of the porous substrate so as not to block the open frontal areas of the cell." In the present specification, the glass seal refers to the entire glass seal in which inorganic particles are dispersed. The entire glass seal in which inorganic particles are dispersed may be referred to as "inorganic particles dispersed glass seal" so as to be clearly distinguished from a part of "glass" (glass included in the glass seal) in the glass seal. The glass seal is preferably made up of glass and inorganic particles.

As shown in FIG. 1, the glass seal 31 is preferably disposed so as to cover a part (near the end of the porous substrate glass seal 3 in the extending direction of the cell 2) of the outer peripheral face 5 of the porous substrate 3 as well. Then when the ceramic filter 100 is stored in the housing 41, "gap" between the "glass seal 31 placed on the outer peripheral face 5 of the porous substrate 3" and the housing 41 is preferably blocked by a seal member 44. Specifically, the seal member 44 such as an O-ring is preferably disposed between the "glass seal 31 disposed on the outer peripheral face 5 of the porous substrate 3" and the housing 41 so as to block the "gap." Since the surface of the glass seal 31 is smoother than the outer peripheral face 5 of the porous substrate 3, the seal member 44 disposed on the glass seal 31 can improve the sealing property. For better sealing property for the seal member 44 disposed on the glass seal 31, the surface of the glass seal 31 (especially the surface at a part placed on the outer peripheral face 5 of the porous substrate 3) preferably has high smoothness.

Since the glass seal is disposed at the both end faces of the porous substrate so as not to block the open frontal areas of each cell, entering of fluid to be treated (e.g., water to be treated) from the end face (wall face) of the ceramic filter into the inside of the porous substrate can be prevented. Thereby, as shown in FIG. 1, when fluid to be treated F1 is supplied to the end face side on one side of the ceramic filter 100, the fluid to be treated F1 will flow into the cells 2 to pass through the separation membrane 21 and enter the inside of the porous substrate 3. As shown in FIG. 1, the ceramic filter 100 is stored in the housing 41 for use. Then, since the porous substrate 3 is exposed at the outer peripheral face 5 of the porous substrate 3, treated fluid F2 entering the porous substrate 3 is discharged to the outside (outside of the porous substrate 3) from the outer peripheral face 5 of the porous substrate 3. The treated fluid F2 is fluid (e.g., treated water) obtained by filtration of the fluid to be treated F1 with the separation membrane 21.

Figure 3:
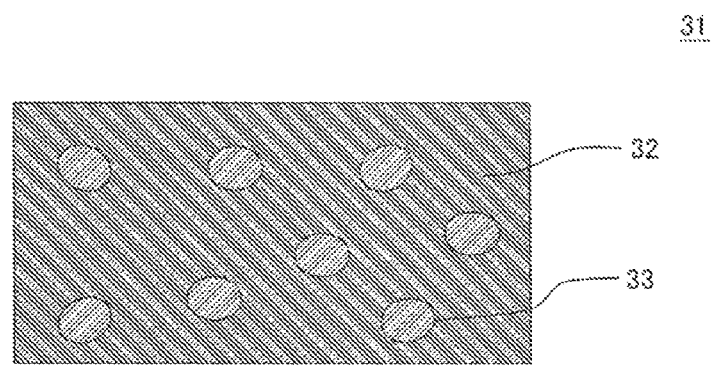
FIG. 3 schematically shows a part of glass seal in cross section that constitutes one embodiment of the ceramic filter of the present invention.

As shown in FIG. 3, the glass seal of the ceramic filter of the present embodiment includes glass 32 and "inorganic particles 33 dispersed in the glass 32 and made of clay." The glass seal 31 has a ratio of the coefficient of thermal expansion to the coefficient of thermal expansion of the porous substrate that is 900 or less. Thus, the ceramic filter of the present embodiment can be used for a long time at a high temperature. FIG. 3 schematically shows a part of the glass seal in cross section that constitutes one embodiment of the ceramic filter of the present invention.

The inorganic particles dispersed in the glass seal are made of clay. Preferable clay includes at least one type selected from the group consisting of kaoline, dolomite, montmorillonite, feldspars, calcite, talc and mica. Among them, the mixture of feldspars and kaoline is preferable. Preferable feldspars include potassium feldspar such as orthoclase.

The ratio of the "coefficient of thermal expansion of the glass seal" to the coefficient of thermal expansion of the porous substrate is 90% or less, preferably 75 to 85%, and more preferably 77 to 83%. When it is larger than 90%, the heat resistance of the ceramic filter of the present embodiment may deteriorate. When it is smaller than 75%, the sealing property by the glass seal may deteriorate. When the ratio of the "coefficient of thermal expansion of the glass seal" to the coefficient of thermal expansion of the porous substrate is 75 to 85%, then the heat resistance of the ceramic filter can be improved, and the sealing property of the glass seal can be kept favorably.

The glass seal of the ceramic filter of the present embodiment has a coefficient of thermal expansion of $5.0 \times 10^{-6}$ to $6.6 \times 10^{-6}$/K preferably, $5.0 \times 10^{-6}$ to $6.3 \times 10^{-6}$/K more preferably and $5.4 \times 10^{-6}$ to $5.8 \times 10^{-6}$/K still more preferably. When it is smaller than $5.0 \times 10^{-6}$/K, cracks may occur at an entering part in the cell after firing. When it is larger than $6.6 \times 10^{-6}$/K, the heat resistance may be insufficient.

The ratio of area (area occupancy) of the inorganic particles to the entire glass seal (hereinafter this may be called "area occupancy of inorganic particles") is 5 to 50% preferably, 10 to 35% more preferably and 18 to 35% especially preferably. When it is smaller than 5%, it becomes hard to use the glass seal for a long time at a high temperature. When it is larger than 50%, the strength and durability of the glass seal may deteriorate. The "area occupancy" of inorganic particles is a value obtained by cutting the glass seal, polishing its cross section and observing a reflected electron image of the cross section using a scanning electron microscope (SEM). Specifically the area of the cross section of the glass seal (120 μm×90 μm) and the area of the entire inorganic particles included in the glass seal are read, and a ratio of the area of the entire inorganic particles to the area of the entire glass seal is calculated, thus finding the value. Herein the area of the entire inorganic particles included in the glass seal is the sum of "areas of a plurality of inorganic particles."

The inorganic particles have an average particle size of 0.5 to 40 μm preferably, and 2 to 14 μm, more preferably. When it is smaller than 0.5 μm or larger than 40 μm, cracks may occur at the glass seal. The average particle diameter of the inorganic particles is found by using a reflective electron image of a cross section of the glass seal shot by a scanning electron microscope (SEM). Specifically, among a plurality of inorganic particles in the photographed reflective electron image, fifty inorganic particles are selected at random, and the diameter of the selected fifty inorganic particles is measured in a fixed direction, and then the value obtained by averaging the obtained diameters in the fixed direction (the average of the fifty inorganic particles) is found. The "diameter in a fixed direction" means a diameter of each inorganic particle in a determined one direction on the "reflective electron image."

The content of inorganic particles is preferably 5 to 70 mass % (ratio to the total mass of the inorganic particles and the glass) in the glass seal, and is 10 to 50 mass % more preferably. When it is smaller than 5 mass %, cracks may occur in the glass seal when the ceramic filter is used for a long time at a high temperature. When it is larger than 70 mass %, the mechanical strength of the glass seal may deteriorate.

The glass seal preferably has a thickness of 30 to 500 μm. When the thickness is less than 30 μm, the durability may deteriorate. When the thickness is more than 500 μm, the glass seal easily stray into the cell, which may interfere with the flowing of fluid. When the glass seal is thick, the ceramic filter may be heavy.

The glass included in the glass seal is not limited especially as long as it can be used as "a seal member that does not transmit fluid" and alkali-free glass is preferable. When alkali-free glass is used as the glass seal, transferring of alkali components from the glass seal can be suppressed at a substantially complete level. As a result, condensation of alkali components derived from the glass seal at the interface between the porous substrate or the separation membrane and the glass seal can be prevented, and so resistance to corrosion of the ceramic filter can be remarkably improved. Thereby the ceramic filter of the present embodiment can effectively prevent erosion of the porous substrate and the separation membrane in the vicinity of the glass seal even after chemical washing performed a large number of times, and so has excellent resistance to corrosion.

Typically "alkali-free glass" refers to glass that does not contain alkali metal oxides at all or having very low content thereof. In the present specification, alkali-free glass means glass having the total content of alkali metal oxides of 1 mol % or less. The "content" of metal oxides in glass in the present specification means a value obtained by analyzing frit powder including the glass by inductively coupled high frequency plasma emission spectrometry (ICP) and determining quantitatively elements contained in the glass. "ICP" is an abbreviation of "Inductively Coupled Plasma Atomic Emission Spectrometer." Specifically, in the case of the alkali-free glass, this means a ratio of the molar number calculated in terms of oxide of a certain element to the total molar number calculated in terms of oxide of the entire elements constituting the alkali-free glass.

Although alkali-free glass is very favorable from the viewpoint of suppressing transferring of alkali components from the glass seal and so improving resistance to corrosion of the ceramic filter, the alkali-free glass itself may not have sufficient resistance to corrosion in some cases. For better resistance to corrosion of the alkali-free glass itself, the alkali-free glass preferably contains 55 to 65 mol %, of silica and 1 to 10 mol % of zirconia. Then, for better resistance to corrosion of the alkali-free glass itself, the alkali-free glass preferably has the following features for the composition. That is, the alkali-free glass preferably contains at least one type of alkali earth metal selected from the group consisting of calcia (calcium oxide), baria (barium oxide) and strontia (strontium oxide) and doe not contain zinc oxide substantially.

Since the alkali-free glass does not contain alkali metal oxides having the function of lowering melting-point, if it is directly used, the firing temperature to form the glass seal becomes high, meaning degraded workability in some cases. To this end, alkali-free glass used preferably contains a component having the function of lowering melting-point, such as alumina ($Al_2O_3$) or boron oxide ($B_2O_3$). Since such a component contained can lower the melting point of the glass, the firing temperature to form the glass seal can be lowered, thus improving workability. Further such a component contained allows the glass seal to be manufactured by firing at a lower temperature, and so the production at low cost is enabled.

(2) Purification Method

The following describes a method to purify fluid using a ceramic filter of the present embodiment.

Fluid (e.g., water) is preferably purified as follows using the ceramic filter 100 of the present embodiment. That is, fluid to be treated preferably is allowed to flow from one end face 11 or from the other end face 12 into the cells 2, thus purifying the fluid. Thereby, the fluid to be treated flowing into the cells 2 passes through the separation membrane 21 placed on the wall face in each cell 2 to become treated fluid, and then enters the porous base material 3 (partition walls and outer peripheral wall). Then the treated fluid entering the porous substrate 3 is discharged to the outside (the outside of the porous substrate 3) through the outer peripheral face 5. At this time, suspended matter, bacteria, dust and the like existing in the fluid to be treated are filtered out (captured) by the separation membrane 21. The ceramic filter 100 of the present embodiment can be used for separation of a mixture by pervaporation or vapor permeation, for example.

As shown in FIG. 1, when fluid is purified using the honeycomb shaped ceramic filter 100 of the present embodiment, the ceramic filter 100 is preferably stored in the tubular housing 41 having a fluid inlet 42 and a fluid outlet 43. Then, the fluid to be treated F1 allowed to flow in through the fluid inlet 42 of the housing 41 is purified with the ceramic filter 100, and the thus purified fluid to be treated (treated fluid F2) is preferably discharged from the fluid outlet 43.

When the ceramic filter 100 is stored in the housing 41, as shown in FIG. 1, gaps between the ceramic filter 100 and the housing 41 are blocked by seal members 44, 44 at both ends of the ceramic filter 100.

A material of the housing 41 is not limited especially, which may be stainless steel, for example. The seal members 44 are not limited especially, which may be an O-ring, for example. Exemplary materials of the seal members 44 include fluoro rubber, silicone rubber and ethylene propylene rubber. These materials are suitable for the usage for a long time at high temperatures.

(3) Method for Manufacturing a Ceramic Filter

A ceramic filter of the present embodiment is manufactured as follows.

(3-1) Porous Substrate

A porous substrate may be manufactured by any known method, not limited especially, to manufacture a porous substrate made of ceramic. For instance, the porous substrate may be manufactured by a method that is known as a method to manufacture a ceramic honeycomb structure used for a filter or the like. For instance, aggregate particles and a dispersion medium as well as additives such as sintering aid and surfactant as needed are firstly mixed so as to prepare a forming raw material. Then, the obtained forming raw material is kneaded to prepare a kneaded material, and the thus obtained kneaded material is formed into a honeycomb shape, thus prospering a honeycomb formed body. The thus obtained honeycomb formed body is then dried and fired, thus preparing a ceramic honeycomb structure. When the porous substrate does not have a separation membrane supporting layer, such a ceramic honeycomb structure can be the porous substrate.

To manufacture the porous substrate having a separation membrane supporting layer, after a honeycomb structure is prepared, slurry to form a separation membrane supporting layer is applied to the wall face in each cell of the honeycomb structure, followed by drying and firing, whereby the porous substrate having a separation membrane is preferably obtained. The slurry to form a separation membrane supporting layer preferably is prepared by mixing aggregate particles and a dispersion medium as well as additives such as surfactant as needed.

(3-2) Separation Membrane

In the case of a precise filtration film for clean water, for example, a separation membrane is preferably formed by applying slurry for film formation to the wall face in each cell of the porous substrate, followed by drying and firing. The slurry for film formation, for example, is preferably prepared by mixing aggregate particles and a dispersion medium as well as additives such as surfactant as needed. The aggregate particles included in the slurry for film formation preferably have an average particle diameter of 0.1 to 10 µm. The slurry for film formation may be applied to the porous substrate by, for example, a method such as dipping, but not limited thereto.

A metal membrane (separation membrane) made of palladium, for example, that is used to separate carbon monoxide or hydrogen may be manufactured by chemical plating, vacuum evaporation, sputtering or the like (JP-4006107, JP-3933907). A carbon membrane may be manufactured, for example, by applying predetermined polyamic acid as a precursor of polyimide resin to the surface of a substrate, followed by heating and drying, thus forming a precursor of the carbon membrane, and then the precursor is thermally decomposed to be the carbon membrane (JP-A-2003-286018). A DDR-type zeolite membrane may be manufactured by hydrothermal synthesis of solution for raw material containing silica and 1-adamantaneamine on the surface of a substrate, thus forming a DDR-type zeolite membrane on the surface of the substrate (JP-A-2004-66188). A silica membrane may be manufactured by applying silica sol solution to the surface of a substrate, followed by drying and heating, thus manufacturing the silica membrane (WO 2008/050812).

(3-3) Glass Seal

Glass seal (inorganic-particles dispersed glass seal) can be formed by applying slurry for glass seal formation to both end faces of a ceramic filter, followed by drying and firing. The slurry for glass seal formation is preferably prepared by mixing predetermined inorganic particles (powder) to predetermined frit (glass frit), and further mixing water and organic binder thereto. The frit is preferably formed by mixing a predetermined glass raw material to be of a predetermined composition, which is then melted for uniformalization. This is then cooled and pulverized to have an average particle diameter of 10 to 20 for formation of the frit.

EXAMPLES

The following describes examples of the ceramic filter of the present invention in more details, and the present invention is not limited to the following examples at all.

Example 1

A honeycomb shaped ceramic filter having the diameter of an end face in 30 mm was manufactured by the following method.

(Porous Substrate)

20 parts by mass of frit (sintering aid) was added to 100 parts by mass of alumina particles (aggregate particles) of 50 µm in average particle diameter, to which water, dispersant and thickener were added for mixture and were kneaded, thus preparing a kneaded material. The thus obtained kneaded material was formed into a honeycomb shape, followed by drying and firing, whereby a porous substrate (porous substrate A) before forming a separation membrane supporting layer was manufactured. The firing was performed at 1,250° C. for 1 hour, and the rate of both of temperature rise and temperature drop was set at 100° C./hour.

The frit used was prepared by melting a glass raw material containing $SiO_2$ (80 mol %), $Al_2O_3$ (10 mol %) and alkali earth metal (8 mol %) at 1,600° C. for uniformalization, which was cooled and then pulverized to have an average particle size of 1 µm. The glass raw material contains, as impurities, MgO, $Na_2O$, $Fe_2O_3$, $TiO_2$ and the like.

The thus obtained porous substrate A was a honeycomb shaped alumina porous body including "cells whose cross sectional shape (shape of a cross section that was perpendicular to the extending direction of the cell) was a circle of 2.6 mm in diameter." The shape (outer shape) of the alumina porous body was a cylindrical shape having an end face (whose outer peripheral shape was a circle) of 30 mm in diameter and having a length in "the cell extending direction" of 20 mm. The number of the cells was 55. The average pore diameter of the porous substrate A was 10 μm. The average pore diameter was a value measured by mercury porosimetry. The porous substrate A had a coefficient of thermal expansion of $7.0 \times 10^{-6}$/K.

(Formation of Separation Membrane Supporting Layer)

Next, a separation membrane supporting layer that was an alumina porous body of 150 μm in thickness and 0.5 R1 in average pore diameter was formed on the wall face in each cell of the porous substrate A. The average pore size was a value measured by the air-flow method specified by ASTM F316.

For the formation of the separation membrane supporting layer, 14 parts by mass of frit (sintering aid) was firstly added to 100 parts by mass of alumina particles (aggregate particles) of 31 μm in average particle diameter, to which water, dispersant and thickener were added for mixture, thus preparing slurry. A "separation membrane supporting layer before firing" was then formed using the slurry on the inner peripheral face of the porous substrate A by filtration film formation described in JP-B-S63-66566. Subsequently, this was fired by an electric furnace in the air atmosphere to form a separation membrane supporting layer, thus obtaining a porous substrate. The firing was performed at 950° C. for 1 hour, and the rate of both of temperature rise and temperature drop was set at 100° C./hour. The frit used was prepared by melting a glass raw material at 1,600° C. for uniformalization, which was cooled and then pulverized to have an average particle diameter of 1 μm. The glass raw material contained $SiO_2$ (77 mol %), $ZrO_2$ (10 mol %), $LiO_2$ (3.5 mol %), $Na_2O$ (4 mol %), $K_2O$ (4 mol %), CaO (0.7 mol %) and MgO (0.8 mol %).

(Formation of Separation Membrane)

Next, a separation membrane that was a titania porous body of 10 μm in thickness and 0.1 μm in average pore diameter was formed on the inner peripheral face (surface of the separation membrane supporting layer) of each cell of the porous substrate. The average pore diameter was a value measured by the air-flow method specified by ASTM F316.

The separation membrane was formed by a similar method to that for the separation membrane supporting layer except that slurry was prepared by adding water, dispersant and thickener to titania particles (powder) as aggregate particles of 0.5 μm in average particle diameter for mixture.

(Formation of Glass Seal)

Figure 4:
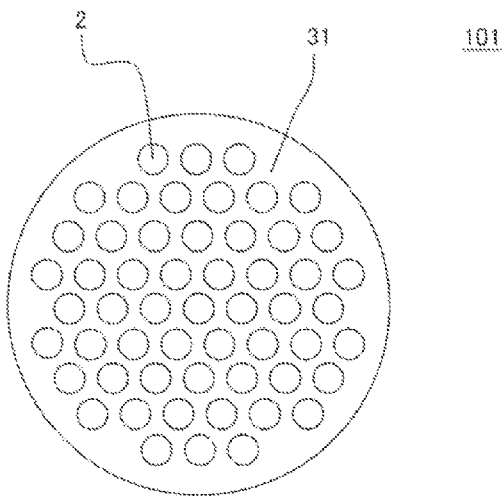
FIG. 4 is a plan view schematically showing a ceramic filter of Example 1.

Next, glass seal was disposed at both end faces of the porous substrate so as not to block the open frontal areas of each cell, and a honeycomb-shaped cylindrical ceramic filter (honeycomb ceramic filter test piece) was obtained as shown in FIG. 4. FIG. 4 is a plan view schematically showing a ceramic filter 101 of Example 1.

Firstly frit (glass frit), "clay A obtained by mixing potassium feldspar and kaoline at the ratio of 4:1 (mass ratio)" (inorganic particles), water and organic binder were mixed, thereby preparing slurry. The mixture ratio of the clay A (inorganic particles) was 5 mass with respect to the total mass of the frit and the clay A (inorganic particles). The mixture ratio of water was 65 parts by mass when the total mass of the frit and the clay A (inorganic particles) was set at 100 parts by mass. The mixture ratio of the organic binder was 7 parts by mass when the total mass of the frit and the clay A (inorganic particles) was set at 100 parts by mass. The organic binder used was methylcellulose. The clay A had a coefficient of thermal expansion of $6.6 \times 10^{-6}$/K. The thus obtained slurry was applied to both end faces of the porous substrate, followed by drying and then firing, thus obtaining a ceramic filter. The glass seal had a thickness of 200 μm. The firing was performed similarly to that for the method to manufacture the above separation membrane supporting layer. The clay A (inorganic particles) in the glass seal had an average particle size of 5 μm.

The frit used as a raw material of the glass seal was prepared by melting a glass raw material at 1,600° C. for uniformalization, which was cooled and then pulverized to have an average particle diameter of 15 μm. The glass raw material contained $SiO_2$ (63 mol %), $ZrO_2$ (3 mol %), $Al_2O_3$ (5 mol %), CaO (9 mol %), BaO (17 mol %) and $B_2O_3$ (3 mol %). This made glass contained in the glass seal alkali-free glass. The frit had a coefficient of thermal expansion of $6.7 \times 10^{-6}$/K.

Figure 5:
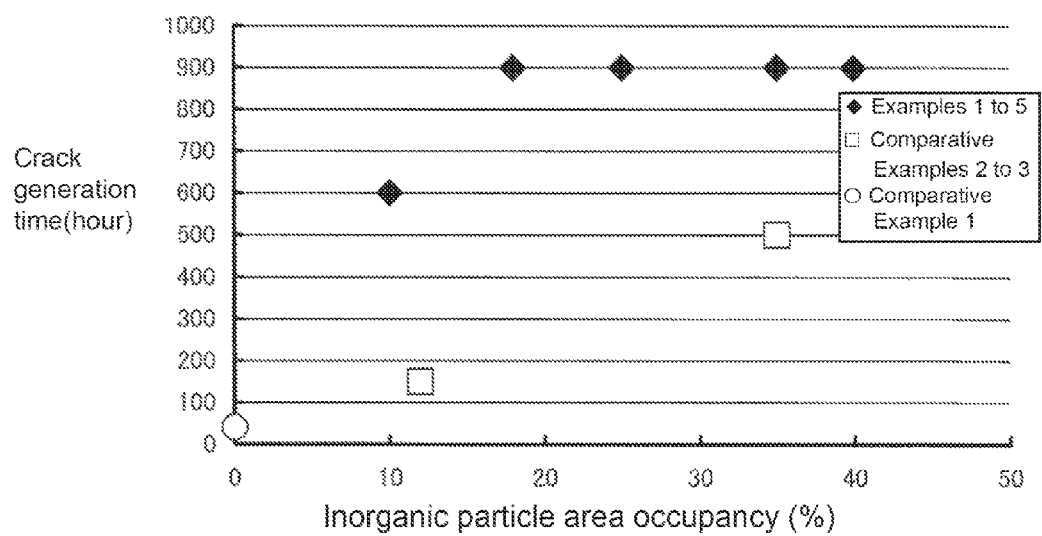
FIG. 5 is a graph representing the relationship between "area occupancy of inorganic particles" and "crack generation time (heat resistance)" for ceramic filters of Examples and Comparative examples.
Figure 6:
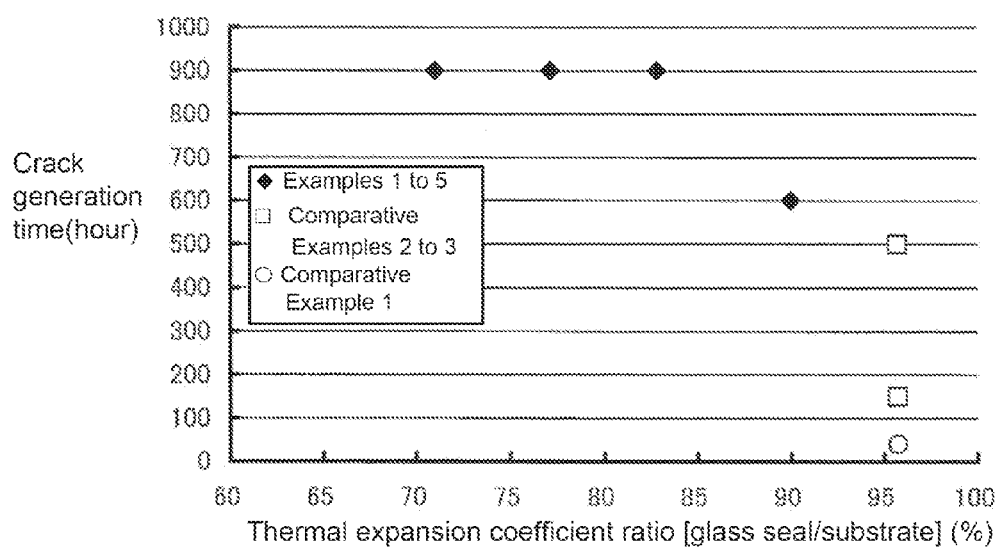
FIG. 6 is a graph representing the relationship between "ratio of coefficients of thermal expansion [glass seal/porous substrate" and "crack generation time (heat resistance)" for ceramic filters of Examples and Comparative examples.

The thus obtained ceramic filter was evaluated for heat resistance and sealing property by the following methods. The area occupancy of inorganic particles also was measured. Table 1 shows the results. FIG. 5 shows a relationship between "area occupancy of inorganic particles" and "crack generation time (heat resistance)," and FIG. 6 shows a relationship between "ratio of coefficients of thermal expansion [glass seal/porous substrate (substrate)]" and "crack generation time (heat resistance)." The coefficients of thermal expansion of the frit and the inorganic particles used as raw materials of the glass seal, the porous substrate A and the glass seal were values measured by the following method. The "ratio of coefficients of thermal expansion [glass seal/substrate]" in Table 1 means a ratio of the coefficient of thermal expansion of the glass seal to the coefficient of thermal expansion of the porous substrate. FIG. 5 is a graph representing the relationship between "area occupancy of inorganic particles" and "crack generation time (heat resistance)," for ceramic filters of Examples and Comparative examples. FIG. 6 is a graph representing the relationship between "ratio of coefficients of thermal expansion [glass seal/porous substrate" and "crack generation time (heat resistance)" for ceramic filters of Examples and Comparative examples.

(Coefficient of Thermal Expansion)

Prismatic samples of 4 mm×3 mm×20 mm were produced using the measurement targets (ceramic filters of Examples 1 to 5 and Comparative examples 1 to 3), and their coefficients of thermal expansion were measured during temperature rise from 50° C. to 500° C. Herein, the extending direction of cells of the ceramic filters was set in the longitudinal direction of the samples. Specifically, an "expansion length" (length expanded in the longitudinal direction) of a sample during temperature rise from 50° C. to 500° C. was firstly measured. Then, such an "expansion length" was divided by a temperature change (500° C.-50° C.=450° C.), which was then divided by the length in the longitudinal direction of the sample (the length at 50° C.), and the thus found values was the coefficient of thermal expansion.

(Area Occupancy of Inorganic Particles)

To find area occupancy of inorganic particles (inorganic particles area occupancy), a ceramic filter obtained was cut so as to cut the glass seal (inorganic particles dispersed glass seal). Then, after a cross section of the glass seal was polished, a reflective electron image of the cross section of the glass seal was observed by a scanning electron microscope (SEM), whereby the area occupancy of inorganic particles was found. More specifically, the area of the cross section of the glass seal (120 μm×90 μm) and the overall area of inorganic particles included in the glass seal were read, and a ratio of the overall area of inorganic particles to the area of the glass seal was calculated, thereby finding the inorganic particles area occupancy. Herein, the overall area of inorganic particles included in the glass seal was the total sum of "areas of a plurality of inorganic particles."

(Sealing Property)

Ceramic filters were manufactured in the same conditions of the ceramic filters of Examples and Comparative examples except that the length in the cell extending direction was 160 mm. The thus obtained ceramic filters were samples for evaluations corresponding to the ceramic filters of Examples and Comparative examples. Then, a sample obtained was put in an immersion container, and the immersion container containing the sample was immersed in water (in water contained in a closed container), and the pressure of the immersion container as a whole was reduced in the closed container for underwater deaeration. Then, compressed air was introduced into the cells in the water, and pressure generated during foaming from the glass seal was measured while increasing the pressure of the compressed air. The compressed air was changed from 0.15 MPa to 0.25 MPa.

(Heat Resistance)

A ceramic filter was placed in an autoclave, which was immersed in water at 180° C., and time until cracks generated at the glass seal was measured.

inorganic particles, the porous substrate A and the glass seal were measured by the above method. Table 1 shows the results.

Comparative Example 1

A ceramic filter was manufactured similarly to Example 1 except that the glass seal did not include inorganic particles. Heat resistance and sealing property were evaluated by the above methods. Coefficients of thermal expansion of the frit, the porous substrate A and the glass seal were measured by the above method. Table 1 shows the results.

Example 6

A ceramic filter was manufactured similarly to Example 1 except that a separation membrane was formed after the formation of the glass seal, the separation membrane supporting layer had a thickness of 250 μm, and a DDR-type zeolite membrane was formed as the separation membrane. Even when the glass seal was exposed to alkali aqueous solution at a high temperature during the preparation the DDR-type zeolite membrane, no cracks occurred in the glass seal.

The DDR-type zeolite membrane was formed as follows.

(1) Preparation of Seed Crystal

DDR-type zeolite crystal powder was prepared based on a method to manufacture DDR-type zeolite described in M. J. den Exter, J. C. Jansen, H. van Bekkum, Studies in Surface

TABLE 1

| | Frit Thermal expansion coefficient ($\times 10^{-6}$/K) | Inorganic particles | | | Porous substrate A Thermal expansion coefficient ($\times 10^{-6}$/K) | Inorganic particle area occupancy (area %) | Inorganic particle average particle diameter (μm) | Glass seal thermal expansion coefficient ($\times 10^{-6}$ K) | Thermal expansion coefficient ratio [glass seal/ substrate] (%) | Heat resistance [crack generation time] (hour) | Sealing property |
|---|---|---|---|---|---|---|---|---|---|---|---|
| | | Material | Average particle size (μm) | Mixture ratio (mass %) | Thermal expansion coefficient ($\times 10^{-6}$/K) | | | | | | |
| Example 1 | 6.7 | Clay A | 5 | 5 | 6.6 | 7.0 | 10 | 5 | 6.3 | 90 | 600 | No foaming |
| Example 2 | 6.7 | Clay A | 5 | 10 | 6.6 | 7.0 | 18 | 5 | 5.8 | 83 | 900 | No foaming |
| Example 3 | 6.7 | Clay A | 5 | 15 | 6.6 | 7.0 | 25 | 5 | 5.4 | 77 | 900 | No foaming |
| Example 4 | 6.7 | Clay A | 5 | 30 | 6.6 | 7.0 | 35 | 5 | 5.4 | 77 | 900 | No foaming |
| Example 5 | 6.7 | Clay A | 5 | 35 | 6.6 | 7.0 | 40 | 5 | 5.0 | 71 | 900 | Foaming at 0.15 Mpa |
| Example 6 | 6.7 | Clay A | 5 | 35 | 6.6 | 7.0 | 10 | 5 | 6.3 | 90 | 600 | No foaming |
| Comparative Example 1 | 6.7 | — | — | — | — | 7.0 | 0 | — | 6.7 | 96 | 40 | No foaming |
| Comparative Example 2 | 6.7 | Alumina | 6.7 | 10 | 6.8 | 7.0 | 12 | 6.7 | 6.7 | 96 | 150 | No foaming |
| Comparative Example 3 | 6.7 | Alumina | 6.7 | 40 | 6.8 | 7.0 | 35 | 6.7 | 6.7 | 96 | 500 | No foaming |
| Comparative Example 4 | 6.7 | — | — | — | — | 7.0 | 0 | — | 6.7 | 96 | — | — |

Examples 2 to 5, Comparative Examples 2, 3

Ceramic filters were manufactured similarly to Example 1 except that the conditions for inorganic particles contained in the glass seal were changed as in Table 1. Then, heat resistance and sealing property were evaluated by the above methods. Area occupancy of the inorganic particles also was measured. Coefficients of thermal expansion of the frit, the Science and Catalysis vol. 84, Ed. by J. Weitkamp et al., Elsevier (1994) 1159-1166. The thus obtained DDR-type zeolite crystal powder was pulverized to be seed crystal. Next, after the seed crystal was dispersed in water, coarse particles were removed, whereby seed crystal dispersed solution was obtained.

(2) Seeding (Particle Adhesion Process)

The thus obtained seed crystal dispersed solution was diluted with ion exchanged water. At this time, this process was performed by adjusting so that the concentration of the DDR-type zeolite crystal was 0.2 mass (solid content concentration in slurry for seeding). Next, the slurry for seeding was allowed to flow into the cells in a porous substrate, so as to apply the slurry for seeding to the inner peripheral face (surface of the separation membrane supporting layer) of the cells of the porous substrate, followed by drying.

(3) Film Formation (Film Formation Process)

7.35 g of ethylenediamine (produced by Wako Pure Chemical Industries, Ltd.) was put in a wide-mouthed jar, to which 1.156 g of 1-adamantaneamine (produced by Aldrich cooperation) was added and was dissolved so as not to leave precipitation of 1-adamantaneamine. 98.0 g and 30 mass % of colloidal silica (SNOWTEX S, produced by Nissan Chemical Industries, LTD.) and 116.55 g of ion exchanged water were put in another container, which was agitated lightly, and this was added to the wide-mouthed jar containing the mixture of ethylenediamine and 1-adamantaneamine, which was shaken strongly for mixture. In this way, raw-material solution was prepared. The "porous substrate to which the slurry for seeding was applied" was disposed in a stainless-steel pressure-resistant container having a fluoro-resin inner cylinder, and the raw-material solution was put in the container for heating treatment (hydrothermal synthesis) at 135° C. for 50 hours. During the hydrothermal synthesis, the solution was alkaline because of colloidal silica and ethylenediamine as the raw materials.

Comparative Example 4

A ceramic filter was manufactured similarly to Comparative example 1 except that a separation membrane was formed after the formation of the glass seal, the separation membrane supporting layer had a thickness of 250 μm, and a DDR-type zeolite membrane was formed as the separation membrane. The thus obtained ceramic filter generated cracks at the glass seal. The DDR-type zeolite membrane was formed similarly to the above Example 6.

It can be understood from Table 1 that the ratio of coefficients of thermal expansion [glass seal/substrate] of 90% or less could suppress cracks generated at the glass seal. It can be understood also that the ratio of coefficients of thermal expansion [glass seal/substrate] of 75 to 85% could realize ceramic filters being excellent in both of heat resistance and sealing property.

It can be understood from Table 1 and FIG. 5 that area occupancy of inorganic particles less than 180 shortened the crack generation time (degraded heat resistance). It can be understood from Table 1 that area occupancy of inorganic particles more than 35% degraded sealing property. Presumably this is due to pores formed because gap between ceramic particles cannot be embedded with glass. These results show that area occupancy of inorganic particles is preferably 18 to 35%.

INDUSTRIAL APPLICABILITY

A ceramic filter of the present invention is used in the wide range of field including not only the field of water treatment and exhaust gas treatment but also pharmaceutical and food fields to filter out suspended matter, bacteria, dust and the like existing in fluid such as liquid and gas for removal. The ceramic filter especially can be used suitably in the field of water treatment such as manufacturing of drinking water/industrial water or purification of sewage and industrial waste water to remove suspended matter or harmful substances such as pathogenic microorganism from liquid.

DESCRIPTION OF REFERENCE NUMERALS

1: partition wall, 2: cell, 3: porous substrate; 4: outer peripheral wall, 5: outer peripheral face, 11: one end face, 12: the other end face; 21: separation membrane, 31: glass seal; 32: glass, 33: inorganic particles, 41: housing, 42: fluid inlet, 43: fluid outlet, 44: seal member, 100, 101: ceramic filter, F1: fluid to be treated, F2: treated fluid

The invention claimed is:

1. A ceramic filter, comprising:
a porous substrate having a partition wall that defines and forms a cell extending from one end face to the other end face, the porous substrate being made of ceramic;
a separation membrane disposed on a wall face in the cell; and
glass seal disposed at the one end face and the other end face so as not to block open frontal areas of the cell,
wherein the glass seal includes glass and inorganic particles dispersed in the glass, the inorganic particles being made of clay,
a ratio of a coefficient of thermal expansion of the glass seal to a coefficient of thermal expansion of the porous substrate is 90% or less, and
an area occupancy of the inorganic particles with respect to the glass seal is 18 to 35%.

* * * * *